(12) United States Patent
Tsai et al.

(10) Patent No.: US 12,346,513 B2
(45) Date of Patent: Jul. 1, 2025

(54) TOUCH DISPLAY DEVICE

(71) Applicant: HIGGSTEC INC., Yilan County (TW)

(72) Inventors: Hung-Yu Tsai, Yilan County (TW);
Pei-Hung Lin, Yilan County (TW);
Ju-Ting Huang, Yilan County (TW)

(73) Assignee: HIGGSTEC INC., Yilan County (TW)

( * ) Notice: Subject to any disclaimer, the term of this patent is extended or adjusted under 35 U.S.C. 154(b) by 0 days.

(21) Appl. No.: 18/514,239

(22) Filed: Nov. 20, 2023

(65) Prior Publication Data

US 2025/0165088 A1 May 22, 2025

(51) Int. Cl.
*G06F 3/042* (2006.01)
*G06F 3/041* (2006.01)
(52) U.S. Cl.
CPC .................................. *G06F 3/0412* (2013.01)
(58) Field of Classification Search
CPC .. G06F 3/0412; G06F 1/1637; G02F 1/13338; H10K 59/40
USPC ........................................................ 345/175
See application file for complete search history.

(56) References Cited

U.S. PATENT DOCUMENTS

2009/0273581 A1* 11/2009 Kim ..................... G02F 1/13338
345/175
2021/0365131 A1* 11/2021 Zhou ..................... G06F 1/1637
2022/0317357 A1* 10/2022 Beon ....................... H10K 59/40

FOREIGN PATENT DOCUMENTS

TW M635227 12/2022

* cited by examiner

*Primary Examiner* — Abdul-Samad A Adediran
(74) *Attorney, Agent, or Firm* — MUNCY, GEISSLER, OLDS & LOWE, P.C.

(57) ABSTRACT

A touch display device is a layered structure, provided with a touch surface, and comprises two light energy filter layers. Each of the two light energy filter layers acts on different optical bands. One of the two light energy filter layers is closer to the touch surface. An optical band wavelength acted upon by one of the two light energy filter layers closer to the touch surface is smaller than an optical band wavelength acted upon by one of the two light energy filter layers farther from the touch surface. One of the two light energy filter layers closer to the touch surface provides protection for a touch portion and a display portion comprised in the layered structure, and one of the two light energy filter layers farther from the touch surface provides protection at least for the display portion comprised in the layered structure.

10 Claims, 2 Drawing Sheets

TOUCH DISPLAY DEVICE

FIELD OF THE INVENTION

The invention relates to a touch display device, and more particularly to a touch display device capable of filtering light energy to provide protection for a touch portion and a display part.

BACKGROUND OF THE INVENTION

The MURA phenomenon is a term used in the field of touch display panels for display screen abnormalities, including inconsistency, irregularity, or cloud spots. Currently, touch display panels are used in a wide range of applications, including personal electronic devices, indoor commercial displays, outdoor interactive digital billboards, etc. When a touch display panel is used in an outdoor environment, since the liquid crystal molecules in the panel are exposed to sunlight, it is easy to produce abnormal liquid crystal flipping in high temperature environments, and it is also easy to cause the MURA phenomenon.

Taiwan patent No. TW M635227 discloses that the touch device is equipped with an infrared barrier plate and an anti-fog film in order to avoid abnormal picture problems caused by high temperature environments. Although the touch device of TW M635227 can block part of the harm of light and avoid fogging of the display screen due to temperature differences. However, in outdoor environments, ultraviolet light in sunlight has higher energy than infrared light. The barrier plate of TW M635227 can only block part of the light and cannot specifically block the effects of ultraviolet light. It is difficult to specifically protect implementation of the touch display device in a high-temperature sunlight environment.

SUMMARY OF THE INVENTION

A main object of the invention is to solve the problem that conventional devices are incapable of specifically filtering damages caused by light.

In order to achieve the above object, the invention provides a touch display device which is a layered structure and provided with a touch surface. The touch display device comprises two light energy filter layers, each of the two light energy filter layers acts on different optical bands, one of the two light energy filter layers is closer to the touch surface, an optical band wavelength acted upon by one of the two light energy filter layers closer to the touch surface is smaller than an optical band wavelength acted upon by one of the two light energy filter layers farther from the touch surface, one of the two light energy filter layers closer to the touch surface provides protection for a touch portion and a display part comprised in the layered structure, and one of the two light energy filter layers farther from the touch surface provides protection at least for the display part comprised in the layered structure.

In one embodiment, an optical band wavelength acted upon by one of the two light energy filter layers is between 200 nm and 380 nm, and an optical band wavelength acted upon by the other of the two light energy filter layers is higher than 800 nm.

In one embodiment, one of the two light energy filter layers closer to the touch surface is located on the touch portion, and one of the two light energy filter layers farther from the touch surface is located on the display portion.

In one embodiment, the touch display device comprises two adhesive layers, one of the two adhesive layers is disposed on the touch portion, the other of the two adhesive layers is disposed on the display portion, one of the two adhesive layers disposed on the touch portion is protected by one of the two light energy filter layers closer to the touch surface, and one of the two adhesive layers disposed on the display portion is protected by the two light energy filter layers. In one embodiment, one of the two adhesive layers disposed on the display part is disposed on the display portion by air bonding or direct bonding.

In one embodiment, the two light energy filter layers are stacked on the touch portion.

In one embodiment, the touch display device comprises two adhesive layers, one of the two adhesive layers is stacked on the touch portion, the other of the two adhesive layers is stacked on the display portion, and the two adhesive layers are protected by the two light energy filter layers.

Through the foregoing implementation of the invention, compared with the prior art, the invention has the following characteristics: the invention is provided with the two light energy filter layers, each of the two light energy filter layers acts on different optical bands, one of the two light energy filter layers closer to the touch surface provides protection for the touch portion and the display portion comprised in the layered structure, and one of the two light energy filter layers farther from the touch surface provides protection at least for the display part comprised in the layered structure.

DETAILED DESCRIPTION OF THE PREFERRED EMBODIMENTS

Figure 1:
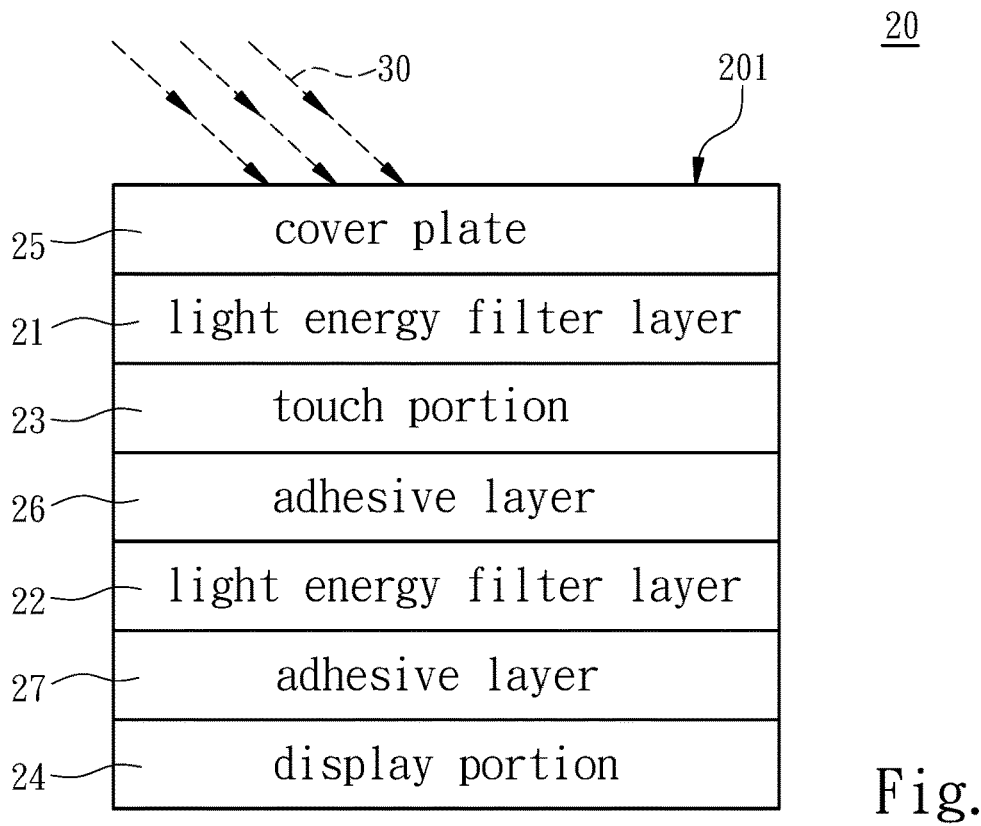
FIG. 1 is a first schematic structural diagram of a first embodiment of the invention.

The detailed description and technical content of the invention are described below with reference to the accompanying drawings.

Please refer to FIG. 1, FIG. 2, FIG. 3, FIG. 4. A touch display device 20 provided in the invention aims to filter light energy so that the problem of abnormality or damage to internal structures can be reduced after the touch display device 20 is installed outdoors and exposed to sunlight 30. Before explaining two light energy filter layers 21, 22 comprised in the touch display device 20, basic structures of the touch display device 20 are first explained. The touch display device 20 is a layered structure. The touch display device 20 comprises a touch portion 23 and a display portion 24. The touch portion 23 is located above the display portion 24. The touch portion 23 is disposed with at least one touch sensing component. The at least one touch sensing component is not limited to capacitive sensing, resistive sensing, piezoelectric sensing, etc., each of the at least one touch sensing component has two electrodes arranged at intervals, and touch control is determined based on changes in electrical properties between the two electrodes. In one embodiment, the at least one touch sensing component can be implemented with touch conductive glass (Indium tin oxide glass, ITO glass) or touch conductive film (Indium tin oxide Glass film, ITO film). The display portion 24 is a screen display of the touch display device 20. The display portion 24 contains a plurality of liquid crystal molecules. The liquid crystal molecules are capable of flipping through an energization state of the touch display device 20, thereby producing changes in display screen.

Further, the touch display device 20 comprises a touch surface 201, and the touch surface 201 is where the touch display device 20 is being touched by users. In one embodiment, the touch display device 20 is further disposed with a cover plate 25 located above the touch portion 23, and the touch surface 201 is formed on the cover plate 25.

In addition, the two light energy filter layers 21, 22 are located in below the touch surface 201, and each of the two light energy filter layers 21, 22 acts on different optical bands. In detail, one of the two light energy filter layers 21, 22 filters the ultraviolet light band, and the other of the two light energy filter layers 21, 22 filters the infrared light band. Technically, the ultraviolet light band can be further subdivided into long-wavelength ultraviolet light band (UVA), medium-wavelength ultraviolet light band (UVB), and short-wavelength ultraviolet light band (UVC). The infrared light band can be subdivided into near-infrared light band, short-wavelength infrared light band, medium-wavelength infrared light band, and far-infrared light band, and the ultraviolet light band and the infrared light band referred to in this specification are the collective names of the aforementioned bands respectively.

One of the two light energy filter layers 21, 22 is closer to the touch surface 201, and the other of the two light energy filter layers 21, 22 is farther from the touch surface 201. An optical band wavelength acted upon by one of the two light energy filter layers 21, 22 closer to the touch surface 201 is smaller than an optical band wavelength acted upon by one of the two light energy filter layers 21, 22 farther from the touch surface 201. One of the two light energy filter layers 21, 22 closer to the touch surface 201 provides protection for the touch portion 23 and the display portion 24, and one of the two light energy filter layers 21, 22 farther from the touch surface 201 provides protection at least for the display portion 24. That is, an optical band acted upon by one of the two light energy filter layers 21, 22 closer to the touch surface 201 is ultraviolet light, and an optical band acted upon by one of the two light energy filter layers 21, 22 farther from the touch surface 201 is infrared light. Since ultraviolet light has stronger energy than infrared light, it is easy to accelerate aging of the touch portion 23 and the display portion 24. Therefore, one of the two light energy filter layers 21, 22 acting on the ultraviolet light band provides protection for the touch portion 23 and the display portion 24 simultaneously. Irradiation of infrared light on the display portion 24 can easily cause a temperature to rise, causing abnormal flipping of the liquid crystal molecules, thereby causing the MURA phenomenon. Therefore, one of the two light energy filter layers 21, 22 acting on the infrared light band at least provides protection for the display portion 24.

As shown in the drawings of the invention, the touch display device 20 is disposed with the two light energy filter layers 21, 22. One of the two light energy filter layers 21, 22 acting on the ultraviolet light band is closer to the touch surface 201, and one of the two light energy filter layers 21, 22 acting on the infrared light band is farther from the touch surface 201, so that an area of protection provided by one of the two light energy filter layers 21, 22 acting on the ultraviolet light band on the touch display device 20 is larger than an area of protection provided by one of the two light energy filter layers 21, 22 acting on the infrared light band on the touch display device 20, and one of the two light energy filter layers 21, 22 acting on the ultraviolet light band at least partially overlaps with one of the two light energy filter layers 21, 22 acting on the infrared light band.

In summary, it can be known that the touch display device 20 enables the two light energy filter layers 21, 22 to act on different optical bands through disposition of the two light energy filter layers 21, 22. When the touch display device 20 is installed in an outdoor environment and receives irradiation of sunlight 30, the two light energy filter layers 21, 22 are capable of filtering sunlight 30 energy, reducing degradation, aging and MURA phenomenon of the touch portion 23 and the display portion 24 caused by sunlight 30. Therefore, the touch display device 20 of the invention is more suitable for use in outdoor environments than the prior art.

In order for the invention to be capable of enhancing filtering of sunlight 30 energy, in one embodiment, an optical band wavelength acted upon by one of the two light energy filter layers 21, 22 is between 200 nm and 380 nm, and an optical band wavelength acted upon by the other of the two light energy filter layers 21, 22 is higher than 800 nm. In addition, the two light energy filter layers 21, 22 are capable of absorbing light or reflecting light to block heat energy generated by the light and reduce heat energy transfer in the touch display device 20.

Please refer to FIG. 1. In one embodiment, one of the two light energy filter layers 21, 22 closer to the touch surface 201 is located on the touch portion 23, and one of the two light energy filter layers 21, 22 farther from the touch surface 201 is located on the display portion 24. Furthermore, in this embodiment, one of the two light energy filter layers 21, 22 closer to the touch surface 201 absorbs ultraviolet light as a light energy filtering mechanism, and one of the two light energy filter layers 21, 22 farther from the touch surface 201 reflects infrared light as a light energy filtering mechanism.

Figure 2:
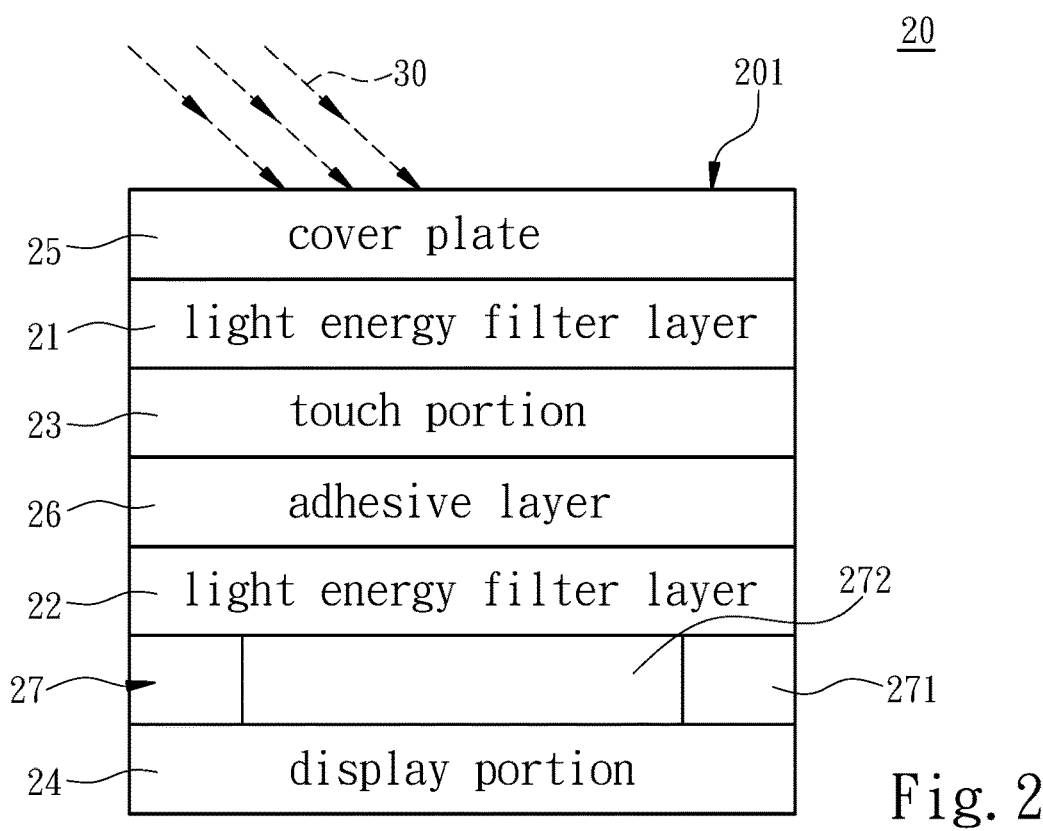
FIG. 2 is a second schematic structural diagram of the first embodiment of the invention.

In this embodiment, in order to assist bonding of the touch portion 23 and the display portion 24, the touch display device 20 further comprises two adhesive layers 26, 27, one of the two adhesive layers 26, 27 is disposed on the touch portion 23, and the other of the two adhesive layers 26, 27 is disposed on the display portion 24. One of the two adhesive layers 26, 27 disposed on the touch portion 23 can be implemented with a solid optical clear adhesive (OCA). The optical clear adhesive is protected by one of the two light energy filter layers 21, 22 that is closer to the touch surface 201. One of the two adhesive layers 26, 27 disposed on the display portion 24 can be disposed on the display portion 24 by air bonding or direct bonding, as shown in FIG. 1 and FIG. 2. For air bonding, it mainly uses at least one adhesive to be arranged along a periphery of the display portion 24. A coating position of the at least one adhesive is indicated by reference numeral 271. The at least one adhesive forms a square shape on the display portion 24, and a part of the display portion 24 that is not coated with the at least one adhesive forms an air gap 272. For direct bonding, it mainly uses a liquid optical clear resin (OCR) to cover the display portion 24. This method will prevent the air gap 272 from forming on the display portion 24, and one of the two adhesive layers 26, 27 disposed on the display portion 24 is protected by the two light energy filter layers 21, 22 whether being implemented by air bonding or direct bonding.

Figure 3:
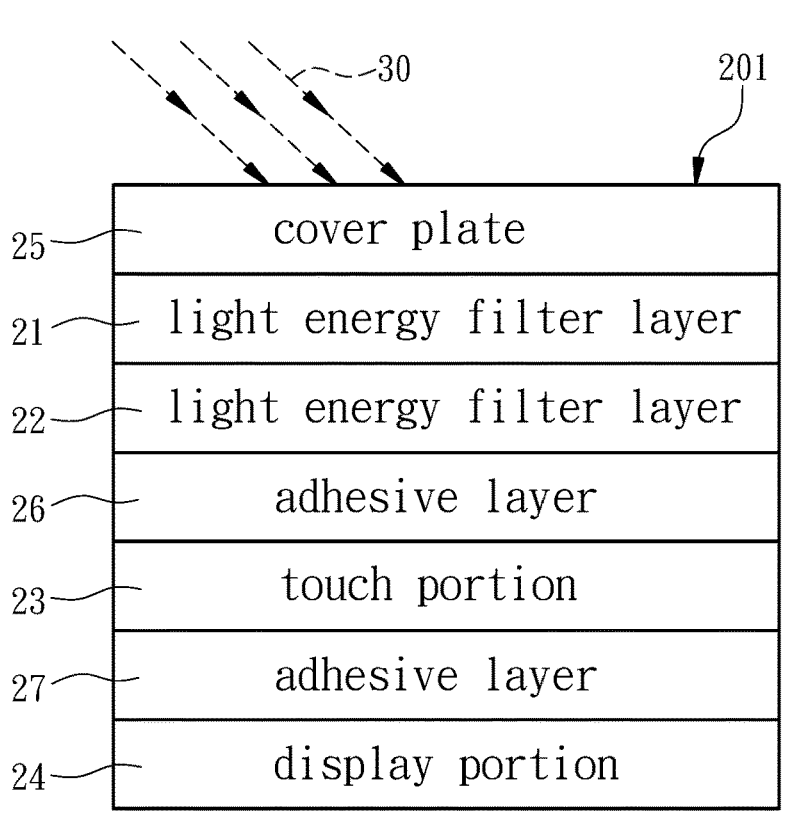
FIG. 3 is a first schematic structural diagram of a second embodiment of the invention.
Figure 4:
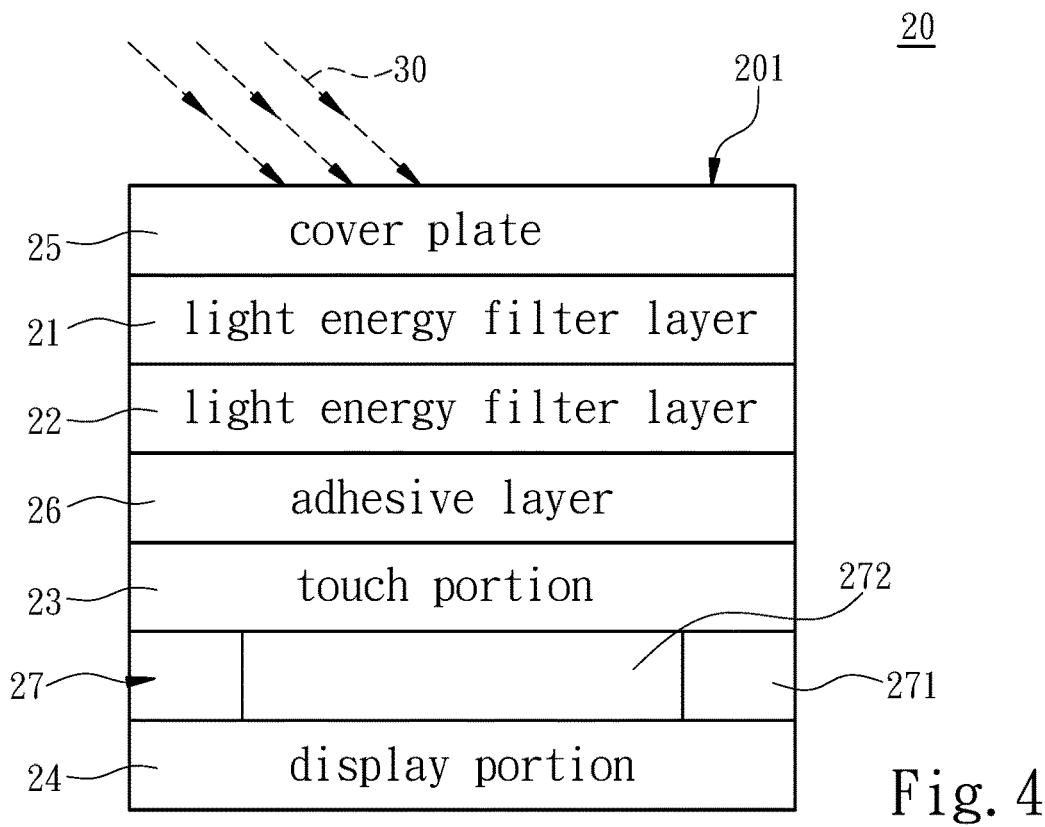
FIG. 4 is a second schematic structural diagram of the second embodiment of the invention.

Please refer to FIG. 3 and FIG. 4 again. The invention further provides another implementation mode of the touch display device 20. The two light energy filter layers 21, 22 are adjacently disposed and stacked on the touch portion 23, one of the two light energy filter layers 21, 22 closer to the touch surface 201 absorbs ultraviolet light as a light energy filtering mechanism, and one of the two light energy filter layers 21, 22 farther from the touch surface 201 absorbs or reflects infrared light as a light energy filtering mechanism. In this embodiment, one of the two adhesive layers 26, 27 is stacked on the touch portion 23 to bond one of the two light energy filter layers 21, 22 farther from the touch surface 201 and the touch portion 23, and the other of the two adhesive layers 26, 27 is stacked on the display portion 24 to bond the touch display device 20 and the touch portion 23. From the above, it can be known that the two adhesive layers 26, 27 of the invention can be simultaneously protected by the two light energy filter layers 21, 22. In addition, a disposition method of the two adhesive layers 26, 27 can be designed according to the aforementioned content in this specification, and can also be adjusted according to actual requirements.

What is claimed is:

1. A touch display device, which is a layered structure and comprising a touch surface, a touch portion, and a display portion, the touch surface located above the touch portion, the touch portion located above the display portion, and the touch display device further comprising a first light energy filter layer and a second light energy filter layer, and the first light energy filter layer and the second light energy filter layer acts on different optical bands;
   wherein the first light energy filter layers is located below the touch surface, and the second light energy filter layer is located below the first light energy filter layer, and wherein an optical band wavelength acted upon by the first light energy filter layer is smaller than an optical band wavelength acted upon by the second light energy filter layer; and
   wherein the first light energy filter layer is configured to provide protection for the touch portion and the display portion comprised in the layered structure, and the second light energy filter layer is configured to provide protection at least for the display portion comprised in the layered structure.

2. The touch display device as claimed in claim 1, wherein an optical band wavelength acted upon by the two first light energy filter layer is between 200 nm and 380 nm, and an optical band wavelength acted upon by the second light energy filter layers is higher than 800 nm.

3. The touch display device as claimed in claim 1, wherein the first light energy filter layer is located on the touch portion, and the second energy filter layer is located on the display portion.

4. The touch display device as claimed in claim 3, wherein the touch display device comprises two adhesive layers, one of the two adhesive layers is disposed on the touch portion, the other of the two adhesive layers is disposed on the display portion, one of the two adhesive layers disposed on the touch portion is protected by the first light energy filter layer, and one of the two adhesive layers disposed on the display portion is protected by the first light energy filter layer and the second light energy filter layer.

5. The touch display device as claimed in claim 4, wherein one of the two adhesive layers disposed on the display portion is disposed on the display portion by air bonding or direct bonding.

6. The touch display device as claimed in claim 5, wherein the touch surface is formed on a cover plate of the touch display device.

7. The touch display device as claimed in claim 1, wherein the first light energy filter layer and the second light energy filter layer are stacked on the touch portion.

8. The touch display device as claimed in claim 7, wherein the touch display device comprises two adhesive layers, one of the two adhesive layers is stacked on the touch portion, the other of the two adhesive layers is stacked on the display portion, and the two adhesive layers are protected by the first light energy filter layer and the second light energy filter layer.

9. The touch display device as claimed in claim 8, wherein one of the two adhesive layers disposed on the display portion is disposed on the display portion by air bonding or direct bonding.

10. The touch display device as claimed in claim 9, wherein the touch surface is formed on a cover plate of the touch display device.

* * * * *